United States Patent [19]

Bruckmann et al.

[11] Patent Number: 5,059,103
[45] Date of Patent: Oct. 22, 1991

[54] UNDERWATER PELLETIZER

[75] Inventors: Theodor Bruckmann, Xanten, Fed. Rep. of Germany; Wayne Martin, Buchanan; Sam Hannah, Eagle Rock, both of Va.

[73] Assignee: Gala Industries, Inc., Eagle Rock, Va.

[21] Appl. No.: 558,874

[22] Filed: Jul. 30, 1990

[51] Int. Cl.$^5$ .................. B29B 9/06; B29C 47/00
[52] U.S. Cl. ....................... 425/67; 264/142; 425/311; 425/313; 425/142
[58] Field of Search .............. 425/67, 311, 313, 69, 425/68, 308, 141, 142; 264/141, 142, 143

[56] References Cited

U.S. PATENT DOCUMENTS

| | | | |
|---|---|---|---|
| 3,196,487 | 7/1965 | Snelling | 425/67 |
| 3,266,090 | 8/1966 | Gosney | 425/313 |
| 3,353,213 | 11/1967 | Niemeyer | 425/313 |
| 3,912,434 | 10/1975 | Nagahara et al. | 425/313 |
| 3,981,959 | 9/1976 | Cuff | 264/169 |
| 4,099,900 | 7/1978 | Bradbury et al. | 264/142 |
| 4,123,207 | 10/1978 | Dudley | 425/67 |
| 4,184,833 | 1/1980 | Buchan et al. | 425/313 |
| 4,251,198 | 2/1981 | Atenburg | 425/67 |
| 4,478,565 | 10/1984 | Thompson | 425/308 |
| 4,728,276 | 3/1988 | Pauley et al. | 425/67 |

*Primary Examiner*—Jay H. Woo
*Assistant Examiner*—Khanh P. Nguyen

*Attorney, Agent, or Firm*—Fleit, Jacobson, Cohn, Price, Holman & Stern

[57] ABSTRACT

An underwater pelletizer driven from a standard foot mounted electric motor having a standard C-flange attachment in which a pelletizer shaft having a hub is keyed to the motor shaft and held in place by a set screw with the key being welded in a slot in the pelletizer shaft hub to facilitate its manufacture. The pelletizer shaft includes a spring loaded cutter hub enabling automatic blade attachment and compensating for misalignment with the spring loaded cutter hub being keyed to the pelletizer shaft by a key that is welded in a slot in the spring loaded cutter hub to simplify its manufacture and provide a positive and dependable drive connection to enable movement of the portion of the spring loaded cutter hub connected with the blade assembly. The die plate is provided with carbide tiles and the blade assembly includes tungsten carbide blades to provide extended die ware and extended blade ware. The pelletizer shaft includes a slinger to prevent any liquid migrating through the shaft seal from running along the shaft and getting into the motor bearings. A weep hole is provided in the adaptor connected to the motor flange to dischage seal leakage and a secondary weep slot is provided on the adaptor at its junction with the motor flange to provide additional assurance that liquids leaking past the seal and slinger will not migrate into the motor bearings.

5 Claims, 1 Drawing Sheet

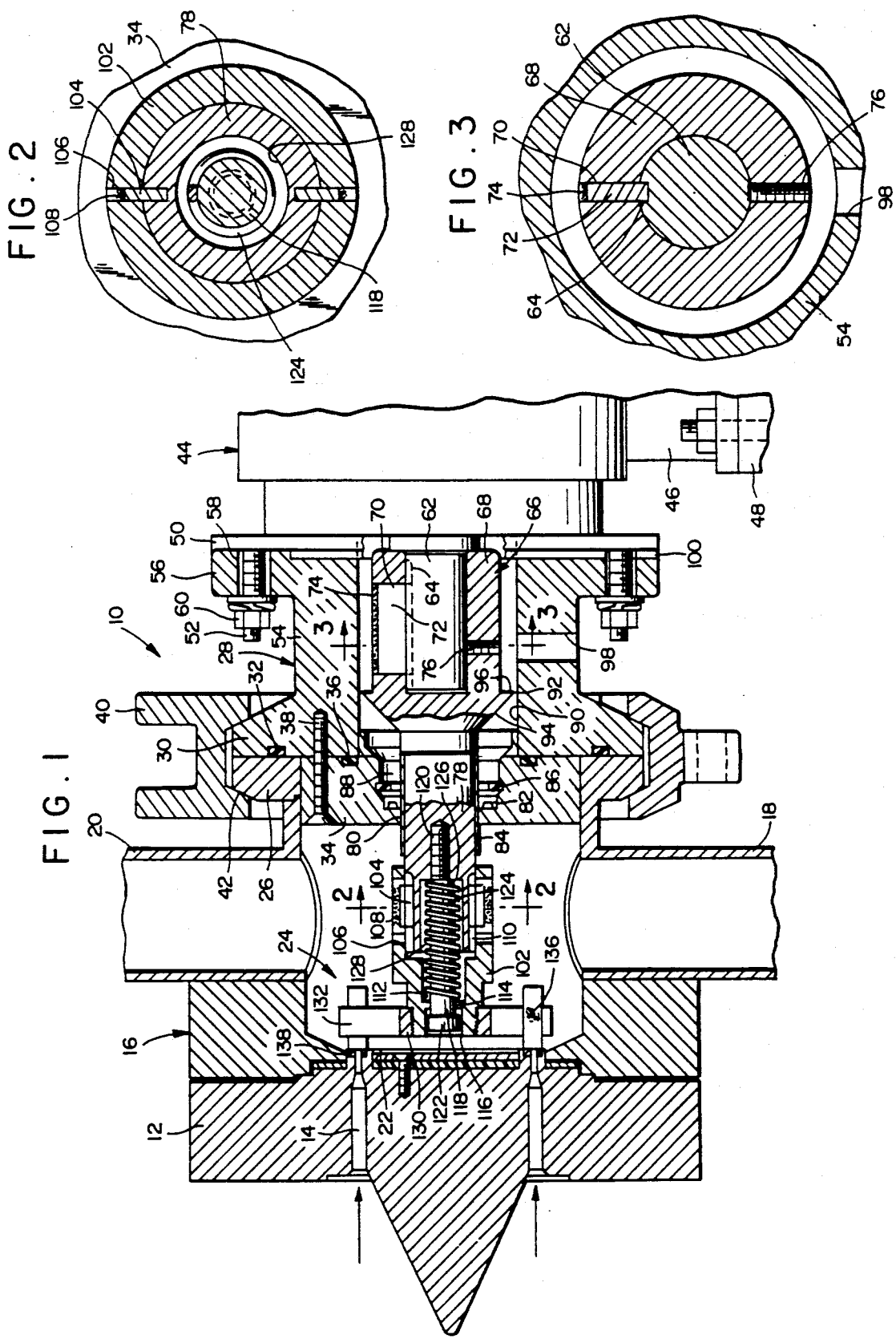

UNDERWATER PELLETIZER

BACKGROUND OF THE INVENTION

1. Field of the Invention

The present invention generally relates to an underwater pelletizer in which a molten polymer is extruded through die orifices in a die plate in the form of continuous strands that are cut into pellets by a rotatable knife assembly having sharp edges engaged with a die face which includes the discharge ends of the die orifices. More specifically, the invention relates to an underwater pelletizer of simple but yet efficient and dependable construction in which the rotatable blade assembly associated with the die face is driven from a standard foot mounted electric motor having a standard C-flange attachment in which the pelletizer shaft is keyed to the motor shaft and held in place by a set screw with the key being welded in a slot in the pelletizer shaft to facilitate its manufacture. The pelletizer shaft includes a spring loaded cutter hub enabling automatic blade adjustment and compensating for misalignment with the spring loaded cutter hub being keyed to the pelletizer shaft by a key that is welded in a slot in the spring loaded cutter hub to simplify its manufacture and provide a positive and dependable drive connection to enable movement of the portion of the spring loaded cutter hub connected with the blade assembly. The die plate is provided with carbide tiles and the blade assembly includes tungsten carbide blades to provide extended die wear and extended blade wear. The pelletizer shaft includes a slinger to prevent any liquid migrating through the shaft seal from running along the shaft and getting into the motor bearings. A weep hole is provided in the adaptor connected to the motor flange to dischage seal leakage and a secondary weep slot is provided on the adaptor at its junction with the motor flange to provide additional assurance that liquids leaking past the seal and slinger will not migrate into the motor bearings.

2. Description of the Prior Art

Underwater pelletizers have been used for a number of years to form pellets or granuals of plastic material and various patents have been granted relating to various improved pelletizer structures including U.S. Pat. Nos. 4,123,207; 4,251,198; 4,500,271; 4,621,996; and 4,728,276 owned by the Assignee of this invention. Additionally, prior patents exist which disclose a spring loaded type of hub structure interconnecting a drive shaft and a cutter blade assembly as illustrated in the following patents.

U.S. Pat. No. 3,196,487
U.S. Pat. No. 3,266,090
U.S. Pat. No. 4,422,372
U.S. Pat. No. 4,421,470
U.S. Pat. No. 4,874,307

While many developments and improvements have been made in underwater pelletizers, the above mentioned patents do not disclose the specific structural arrangements disclosed in this application.

SUMMARY OF THE INVENTION

An object of the present invention is to provide an underwater pelletizer utilizing a close coupled electric motor and adaptor interconnecting the motor and water box of the pelletizer with a quick clamp connection between the motor adaptor and water box together with a spring loaded hub connecting the pelletizer shaft to a blade assembly associated with the die face of a die plate through which molten polymer is being extruded.

Another object of the invention is to provide an underwater pelletizer in accordance with the preceding object in which the pelletizer shaft is connected to the output shaft on the electric drive motor by a unique welded key arrangement to provide a positive driving connection.

A further object of the invention is to provide an underwater pelletizer in accordance with the preceding objects in which the spring loaded cutter hub includes a unique welded key drive connection with the pelletizer shaft to enable automatic adjustment of the blade assembly in relation to the die face and to compensate for misalignment.

Still another object of the invention is to provide an underwater pelletizer that includes a seal for the pelletizer shaft, a slinger mounted between the seal and the motor combined with a weep hole in the adaptor and a secondary weep slot on the adaptor to further assure that any liquid leaking past the seal will not migrate along the shaft into the motor bearings.

A still further object of the invention is to provide an underwater pelletizer in which the welded key drive connections set forth in the preceding objects provides a positive driving connection which enables relative axial movement with the driving connection resulting from simple manufacturing procedures to maintain the cost of manufacturing at a minimum and substantially less than a conventional spline drive connection.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a longitudinal, vertical sectional view of the underwater pelletizer of the present invention.

FIG. 2 is a tranverse, sectional view taken substantially upon a plane passing along section line 2—2 on FIG. 1 illustrating specific structural details of the spring loaded cutter hub.

FIG. 3 is a transverse, sectional view taken substantially upon a plane passing along section line 3—3 on FIG. 1 illustrating structural details of the motor drive connection.

DESCRIPTION OF THE PREFERRED EMBODIMENT

The underwater pelletizer of the present invention is generally designated by a reference numeral 10 and includes a conventional die plate 12 having a plurality of die orifices 14 incorporated therein through which molten polymer can flow as indicated by the arrows in FIG. 1. The die plate 12 is connected with a pelletizer water box 16 having a water inflow pipe 18 and a water and pellet outlet pipe 20 associated therewith. The die plate includes a die face 22 associated with a rotatable blade assembly 24. The above described structure is conventional in underwater pelletizers with the continuous strands of molten polymer being extruded through the die orifice 14 being cut into pellets or granules and entrained in waterflow in a conventional and well known manner.

The pelletizer water box includes a flange 26 on the end thereof remote from the cutter blade assembly 24. Connected to the flange 26 is a generally cylindrical adaptor 28 having a flange 30 that is the same size as the flange 26 with the flanges 26 and 30 including planar facing surfaces with the flange 30 including a recessed O-ring seal 32 therein and the flange 26 is provided with a flange plate 34 having an oppositely facing O-ring seal 36 therein. The flanges 26 and 30 are accurately aligned by an interconnecting screw structure 38 and are retained in tight connected relation by a quick opening clamp 40 which enables quick assembly and disassembly of the adaptor 28 in relation to the pelletizer water box 16. The quick opening clamp and the flanges having corresponding inclined surfaces 42 to securely clamp the flanges 26 and 30 together. The structure which provides for quick opening of the clamp is well known and conventional.

The adaptor 28 is connected to a standard foot mounted electric motor 44 which is supported by depending and laterally extending flanges or feet 46 connected to a suitable support structure 48. The motor 44 includes a standard C-flange attachment 50 having a plurality of bolts 52 extending laterally and rigidly therefrom. The adaptor 28 includes a cylindrical body 54 having the flange 30 on one end and a flange 56 on the other end having apertures 58 receiving the bolts 52 with the flanges 50 and 56 being secured together by the bolts 52 and nut and washer assemblies 60 thereon thus rigidly and detachably securing the adaptor and the motor in rigid relation.

The motor 44 includes an output drive shaft 62 having a longitudinal keyway 64 along one surface thereof for driving connection with a pelletizer shaft generally designated by numeral 66. The pelletizer shaft 66 includes a cylindrical hub 68 telescoped over the shaft 62 with the hub 68 including a longitudinal slot 70 therein which receives a drive key 72 that has an inner edge received in the groove 64. The key 72 is rigidly secured in the slot 70 as by welding 74 thus keying the hub 68 to the shaft 62. A set screw 76 is threaded through the hub 68 in opposed relation to the key 72 to lock the hub 68 on the shaft 62. The set screw enables assembly and disassembly of the hub 68 with the output shaft 62 of the motor 44 with the key 72 transferring drive torque from the shaft 62 to the hub 68. The pelletizer shaft 66 includes a reduced portion 78 extending through an opening 80 in the flange plate 34 with a seal 82 in the opening 80 and engaging a bushing 84 on the shaft 78 with the seal being retained in place by a split spring ring 86 accessible through an enlargement 88 of the opening 80 which communicates with the surface of the flange plate 34 and the enlarged open central area 90 of the adaptor 28. The seal 82 prevents migration of water between the pelletizer shaft 66 and the flange plate 34 and any leakage which might occur is discharged radially from the pelletizer shaft 66 by a peripheral tapered projection forming a slinger 92. The projection or slinger 92 defines the outer edge of a conical enlargement 94 between the hub 68 and the reduced portion 78 of the cutter shaft 66 with the outer edge of the conical surface terminating in a radial surface 96 extending inwardly to the exterior cylindrical periphery of the hub 68 as illustrated in FIG. 1 thereby slinging water or liquid radially on to the surface of the hollow interior 90 of the cylindrical member 54 forming a portion of the adaptor 28. The bottom of the adaptor is provided with a weep hole 98 which will drain any water slung against the surface of the adaptor by the slinger 92. Any leakage which occurs past the weep hole 98 will be drained by a secondary weep slot 100 in the surface of the flange 56 which engages the flange 50. The slot 100 extends radially from the bottom of the flange 56 to a point above the interior surface 90 as illustrated in FIG. 1 to further assure that leakage of liquid past the seal 82 will not reach the motor bearings with the slinger, weep hole and secondary weep slot providing discharge of any liquid leakage.

The cutter blade assembly 24 includes a spring loaded cutter hub 102 of cylindrical configuration which telescopes over the reduced portion 78 of the pelletizer shaft 66 and which is drivingly connected thereto by opposed longitudinal keys 104 that are welded in slots 106 in the hub 102 as by welding 108. The inner edges of the longitudinal keys 104 are slidably received in keyways or grooves 110 in the reduced portion 78 of the pelletizer shaft 66 to enable axial movement of the hub 102 and some degree of lateral movement. The end of the hub 102 remote from the keys 104 includes a hollow interior 112, and inwardly extending flange 114 and a recess 116 extending to the end of the hub. A shouldered bolt 118 is screw threaded into an axial internally threaded bore 120 in the reduced portion 78 of the pelletizer shaft 66. The bolt includes a retaining head 122 received in the recess 116 with the shoulder 114 limiting outward movement of the hub 102 by engagement with the bolt head. A compression coil spring 124 extends between the flange 114 on the hub 102 and a shoulder 126 at the inner end of an internal bore 128 which receives the bolt 118 in the reduced portion 78 of the pelletizer shaft 66. The hub 102 includes a removable blade hub 130 thereon having a plurality of radial arms 132 supporting inclined blades 134 secured in place by clamp screws 136. The blades 134 are tungsten carbide blades and the die face 22 includes round tungsten carbide tiles 138 which cooperate with the tungsten carbide blades to provide extended wear life to both the blades and the die face.

With this construction, the drive motor and adaptor can be quickly and easily connected to the water box of the pelletizer with the driving connection between the motor shaft and the pelletizer shaft providing a simplicity of manufacture and assembly as does the driving connection between the spring loaded cutter hub and the pelletizer shaft which is accomplished by virtue of the welded drive keys being welded to the external hub and slidably received in the grooved internal shaft. The slinger combined with the seal and the initial large weep hole between the slinger and the drive motor provides for discharge of most if not all of any liquid leaking past the seal with the secondary weep slot assuring that any moisture or liquid which migrates along the pelletizer shaft will be discharged prior to reaching the bearings in the electric motor. The spring loaded cutter hub provides automatic adjustment of the blades in relation to the die face and also compensates for slight misalignment which may occur.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An underwater pelletizer comprising a die face having a plurality of die orifices extending therethrough through which a continuous strand of molten polymer is extruded, a cutter blade assembly facing the die face and including blades for cutting the strands of polymer extruded from the die orifices into pellets, a water box enclosing the die face and cutter blade assembly to entrain the formed pellets in a flow of water, means supporting said cutter blade assembly and means driving the cutter blade assembly from a point exterior of the water box, said means supporting the cutter blade assembly including a flange means on the water box remote from the die face, a pelletizer shaft extending through the flange means, seal means and bearing means supporting the pelletizer shaft from the flange means, the improvement comprising a spring loaded cutter hub mounting the cutter blade assembly on the pelletizer shaft, said spring loaded cutter hub including a headed retaining bolt which enables movement of the cutter blade assembly toward the die face without axial restriction by the bolt head, said means driving the cutter blade assembly including an electric motor having an output shaft, a flange on the electric motor, and means mounting the electric motor from the water box, said mounting means for the electric motor including an adaptor having a flange at each end thereof for engagement with the flange means on the water box and the flange on the electric motor, and a driving connection within the adapter between the output shaft of the motor and the pelletizer shaft for driving the pelletizer shaft, said adaptor including longitudinally spaced drain means to discharge any liquid which leaks past the seal means between the pelletizer shaft and water box flange means.

2. The structure as defined in claim 1 wherein said driving connection between the motor shaft and pelletizer shaft comprises a cylindrical, hollow hub on the end of the pelletizer shaft telescopically engaged over the motor shaft, said motor shaft having a longitudinal groove therein extending to the end of the motor shaft remote from the motor, said hub on the pelletizer shaft including a radial slot extending from the inner to the outer surface thereof, a longitudinal key welded in said slot, said key projecting radially inwardly of the hub and slidably engaging the groove in the motor shaft to enable the hub to telescope over the motorshaft with the key providing a driving connection to transmit torque, and a set screw interconnecting the pelletizer shaft hub and the motor output shaft to preclude sliding movement of the hub to retain the hub on the shaft.

3. The structure as defined in claim 2 wherein said pelletizer shaft includes a peripheral projection defining a slinger between the seal means and drive motor flange to sling any leakage past the seal means into the adaptor for drainage through the drain means.

4. The structure as defined in claim 3 wherein said drain means includes a downwardly opening weep hole in the adaptor between the slinger and motor flange, said drain means also including a radial secondary weep slot in the adaptor flange to drain any water which migrates along the pelletizer shaft hub past the weep hole.

5. The structure as defined in claim 4 wherein said spring loaded cutter hub includes a hollow cylindrical hub member telescoped over an end portion of the pelletizer shaft, said pelletizer shaft including opposed longitudinal grooves therein and said cylindrical hollow hub including radial slots having longitudinal keys welded therein with the keys extending radially inwardly for slidably engagement with the grooves to provide a driving connection between the pelletizer shaft and the spring loaded cutter hub while enabling longitudinal movement of the spring loaded cutter hub, said bolt extending longitudinally therethrough and anchored to the end of the pelletizer shaft, a coil spring encircling the bolt with one end engaging the end of the pelletizer shaft, said spring loader cutter hub including an internal flange engaged by the other end of the spring to spring bias the cutter hub toward the die face, said cutter blade assembly being mounted on said cutter hub for movement therewith without bolt head contact whereby the spring loaded cutter hub provides automatic adjustment of the cutter blade assembly in relation to the die face and compensates for misalignment of the cutter blade assembly with the die face.

* * * * *